Feb. 13, 1934.  W. J. OLLINGER ET AL  1,947,057

SIZING OR STIFFENING MACHINE

Filed Nov. 23, 1931

William J. Ollinger,
Charles Niedhammer,
INVENTOR

BY Henrik J. Schmidt
ATTORNEY

Patented Feb. 13, 1934

1,947,057

UNITED STATES PATENT OFFICE 1,947,057

SIZING OR STIFFENING MACHINE

William J. Ollinger, New York, and Charles Niedhammer, Sunnyside, N. Y.

Application November 23, 1931
Serial No. 576,778

3 Claims. (Cl. 223—32)

The invention relates to machines for sizing or stiffening hat blanks, as for example blanks made of felt. It has for its main object to provide a machine thoroughly automatic in its operation so that the only work required of its operator is that of inserting the blanks. Another object is to provide adjustable means for regulating the flow of sizing fed to the blanks and to regulate the timing of this flow. A further object is to provide means for stopping the rotation of the sizing roller while the blanks are being fed and to provide means for correctly adjusting the rollers. A still further object is to provide a machine of simple and strong construction, which will operate with a minimum expense for power, and which can be manufactured at a comparatively low cost.

Figure 1:
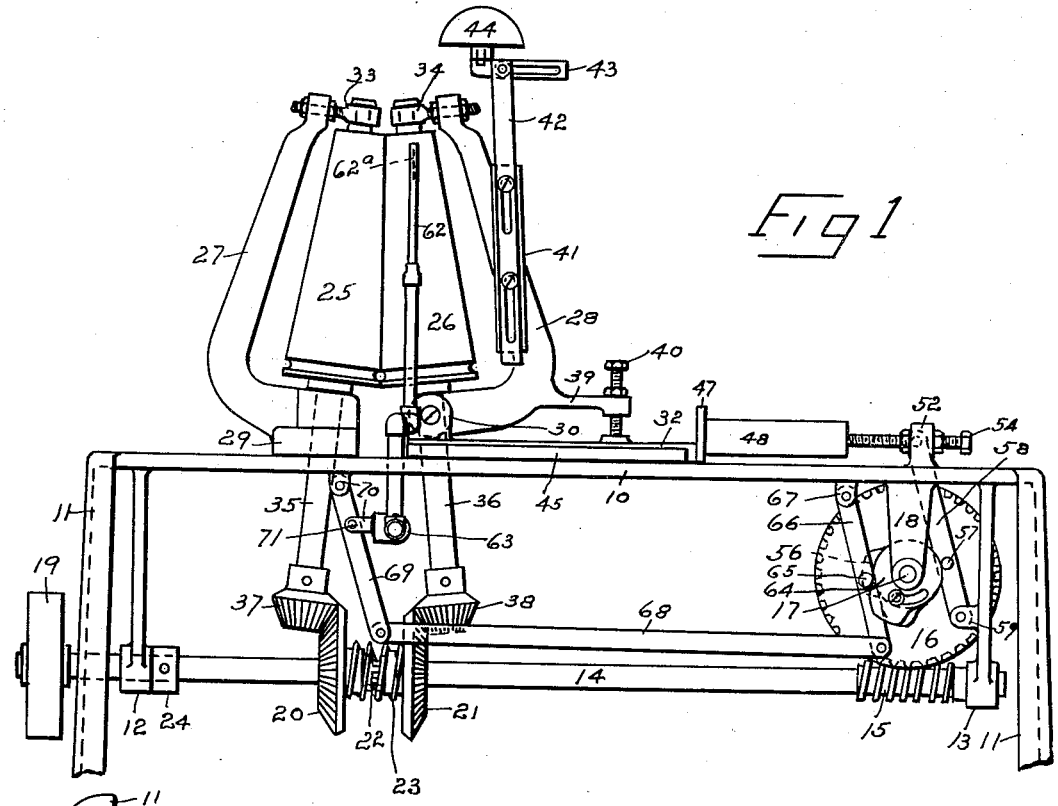
Figure 2:
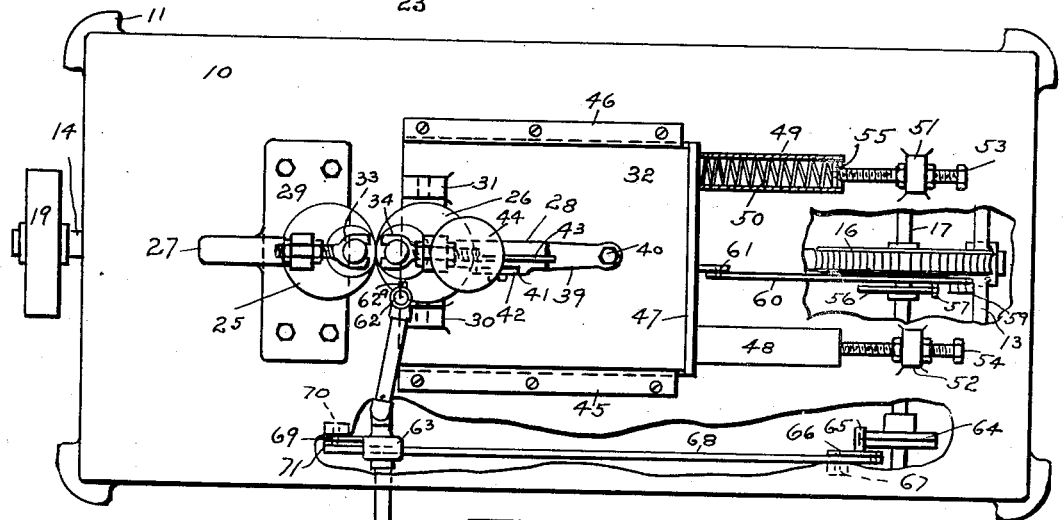

These and other objects and advantages will be readily understood from the following description and from the accompanying drawing of a preferred embodiment of the invention in which, however, modifications may be made without departing from the scope of the appended claims. In the drawing, Fig. 1 is a side elevation of the preferred embodiment, parts of the legs being broken off;

Fig. 2 a plan elevation shown partly in section and with parts broken away; and

Figure 3:
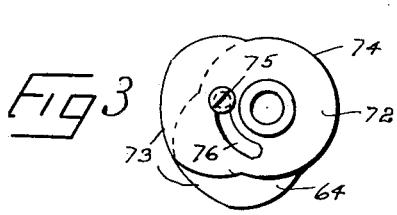

Fig. 3 a side elevation of a certain cam employed in the machine.

Referring now to all the views, simultaneously, the machine consists of a table 10, having legs 11. Bearings 12 and 13 extend downwardly from under the top of the table and in these the main shaft 14 rotates. A worm 15 is secured on the main shaft and drives a worm gear 16 secured on a transverse shaft 17 which rotates in bearings 18. These bearings are also located below the table top. A pulley 19 is secured on the main shaft and to this power is imparted. A bevel gear 20 is pinned to the main shaft, while another bevel gear 21 is slidingly mounted on the shaft. The hubs of these gears constitute a clutch 22 and a compression spring 23 tends normally to keep the clutch open. A stop collar is shown at 24.

Two cone shaped rollers 25 and 26 are mounted in frames 27 and 28 located on top of the table. The frame 27 has a base 29 which is rigidly clamped to the table. The other frame is swingably mounted between two bearings 30 and 31 which are cast integral with a sliding block 32. The upper ends of the frames are bifurcated and support threaded forks 33 and 34 in which the upper ends of the roller shafts 35 and 36 rotate. The rollers are rigidly secured to these shafts.

The shafts are also supported in bearings formed in the lower parts of the frames and have bevel pinions 37 and 38 secured on their lower ends. These pinions mesh with the bevel gears 20 and 21.

An arm 39 is formed on the frame 28 and an adjusting screw 40, threaded in this arm, allows the frame to be tilted to adjust the rollers in parallel relation. As the main shaft turns the rollers rotate in opposite directions. A seat 41 is formed on the frame 28 and to this a bar 42 is clamped. A cross bar 43 is clamped to the upper end of this bar and carries a block 44 on which the blanks to be treated are supported. Both the bars are adjustable so that the block may be placed in any desired position in relation to the rollers.

The sliding block 32 is guided between two guiding strips 45 and 46 which are clamped to the table. A plate 47 is fastened to its rear end and on this two spring barrels 48 and 49 are secured. The spring barrel 49 is shown in cross-section. Compression springs 50 are contained in the barrels. Lugs 51 and 52 are secured on the table and in these adjusting screws 53 and 54 are threaded. The ends of the screws are provided with discs 55 which abut against the springs. The sliding block is actuated by a cam 56 which is pinned on the transverse shaft 17. The face of this cam engages a pin 57 riveted on a lever 58, one end of which is pivoted to a bracket 59 cast integral with the bearing 13. The other end of the lever is connected by a link 60 to a lug 61 secured on the plate 47.

The sizing mechanism consists of a tube 62, having a long narrow orifice 62a, which is placed adjacent to the upper part of the roller 26, as plainly shown in Fig. 1. The tube is connected by suitable pipes and fittings to a gate valve 63 which regulates the flow of the size. The size is preferably conveyed to the valve from an overhead tank. While a gate valve is shown, it is evident that any other suitable valve may be used. The valve is operated by a cam 64 which is also pinned on the transverse shaft 17. The cam face engages a pin 65 riveted on a lever 66 which is pivoted at one end to a lug 67. The other end is connected to a link 68 which actuates a lever 69 pivoted to a lug 70. The valve stem 71 is connected to this lever. The valve-operating cam is preferably made as shown in the enlarged view Fig. 3. It may be said to consist of two cams located on the same hub and which may be rotated in relation to each other. The main cam is shown at 64. An auxiliary cam 72 is rotatingly mounted on the same hub so that the rise 73 and dwell 74 of the cam may be altered, thereby keeping the valve 63 open or closed at longer or shorter periods. The two cams are locked in the desired position by a screw 75 which is threaded in one cam and passes through an arcuated slot 76 in the other.

The machine operates in the following manner: Power is imparted to the pulley from any suitable source and, as the main shaft turns, the rollers 25 and 26 are rotated in opposite directions. As the cam 56 rotates, its cam face actuates the lever 57 which, through the link 60, draws the sliding block 32, and consequently the roller 26, rearwardly. Thus the rollers are drawn apart. As the roller 26 moves rearwards the bevel gear 21 slides along the main shaft, due to the action of the spring 23, and the clutch 22 is disengaged. This stops the rotation of the roller. A cupped blank is now inserted between the rollers in such a manner that its center is supported on the block 44. As the cam 56 continues its rotation the sliding block 32 is pushed forward by the action of the springs 50 and the rollers engage the blank. As the sliding block moves forward the bevel gear 21 is also moved and the clutch again engages so that the roller will rotate. The cam 64 has now reached the point in its rotation where it actuates the lever 66 and hence opens the valve 63. A quantity of size is deposited on the roller 26 and as this flows down the side of the roller it is pressed into the blank, thus stiffening it. The sliding block is again drawn back and the whole action repeated.

While the clutch 22 is used in the embodiment shown and described so that the roller 26 will idle when drawn rearwardly, we sometimes find it desirable to have the roller rotate continuously. In such cases we dispense with the clutch and mount the bevel gear on a key fastened in the main shaft so that it may slide on the shaft but still be turned by the key. While we have shown means for applying size to one roller only it is evident that size may be applied to the other roller by adding an additional tube.

From the foregoing it will be seen that we have provided a machine which is thoroughly automatic, which may be operated continuously so as to increase its output, and which can be operated without any great skill on the part of its attendant.

Having described our invention and its operation, what we claim as new and wish to protect by Letters Patent is—

1. In a hat sizing machine comprising a stand on top of which is mounted a pair of tapered, co-acting, vertical sizing rollers rotatable in opposite directions by means of driving members mounted on a continuously-rotating shaft and one of which rollers is slidingly movable in relation to the other roller; co-acting clutch members associated with the driving members mounted on the continuously-rotating shaft, the driving member which drives the slidingly mounted roller being free to rotate on the continuously-rotating shaft, and spring means tending to separate the driving members so as to disengage the clutch members and stop the rotation of the slidingly mounted roller.

2. In a hat sizing machine comprising a stand on top of which is mounted a pair of tapered, co-acting, vertical sizing rollers rotatable in opposite directions by means of driving members mounted on a continuously-rotating shaft and one of which rollers is slidingly movable in relation to the other roller and in which machine are provided means for automatically applying sizing to hat blanks inserted in the machine; co-acting clutch members associated with the driving members mounted on the continuously-rotating shaft, the driving member which drives the slidingly mounted roller being free to rotate on the continuously-rotating shaft, spring means tending to separate the driving members so as to disengage the clutch members and stop the rotation of the slidingly mounted roller, the sliding movement of the roller effected through the instrumentality of a cam mounted on a cam shaft driven by the continuously-rotating shaft, and a second cam secured on said cam shaft for controlling the timing of the sizing charges so that these will only occur while the slidingly mounted roller is rotating.

3. In a hat sizing machine comprising a stand on top of which is mounted a pair of tapered, co-acting, vertical sizing rollers rotatable in opposite directions by means of driving members mounted on a continuously-rotating shaft and one of which rollers is slidingly movable in relation to the other roller and in which machine are provided means for automatically applying sizing to hat blanks inserted in the machine; co-acting clutch members associated with the driving members mounted on the continuously-rotating shaft, the driving member which drives the slidingly mounted roller being free to rotate on the continuously-rotating shaft, spring means tending to separate the driving members so as to disengage the clutch members and stop the rotation of the slidingly mounted roller, the sliding movement of the roller effected through the instrumentality of a cam mounted on a cam shaft driven by the continuously-rotating shaft, a second cam secured on said cam shaft for controlling the timing of the sizing charges so that these will only occur when the slidingly mounted roller is rotating, and said second cam provided with means for increasing or decreasing the amount of sizing discharged.

WILLIAM J. OLLINGER.
CHARLES NIEDHAMMER.